Patented Jan. 30, 1940

2,188,494

UNITED STATES PATENT OFFICE 2,188,494

FILLER AND METHOD OF MAKING SAME

Harold E. Bode, Chicago, Ill., assignor, by mesne assignments, to Corn Products Refining Company, New York, N. Y., a corporation of New Jersey No Drawing. Application September 20, 1937, Serial No. 164,795

5 Claims. (Cl. 134—11)

This invention relates to the production of a mineral filler and the principal object of the invention is to provide a mineral filler comprising an intimate blend of starch and an alkaline earth metal in water-insoluble form, such as calcium carbonate, calcium sulphate, barium carbonate and barium sulphate.

Alkaline earth metals of the type described are widely used as fillers in the manufacture of cosmetics, paper, building materials and the like. For such uses, in which adsorption and blending powers are primary requisites, the filler is preferably in the form of minute and relatively uniform particles. For this reason the product, as mined, is unsuitable as a filler because in such form its particles are too large and lack uniformity.

It has been customary, therefore, to produce the filler from a water-solution of a soluble salt of the alkaline earth by chemical precipitation. The resulting product, though chemically the same as the mined product, possesses superior adsorption and blending properties and normally commands a price approximately three times that of the mined substance.

According to the present invention the alkaline earth metal is precipitated in a water suspension of starch. As each particle of insoluble alkaline earth metal is precipitated in the solution, it will, being positively charged, be attracted to and adsorbed by an electro-negative, colloidal starch granule by the phenomenon of ionic adsorption. The resulting physico-chemical blend will be far more uniform than would be possible to obtain by mechanically mixing these two ingredients.

Starch has heretofore been employed in conjunction with mineral fillers, either by applying or adding the starch separately or by mechanically mixing the two. The advantages of the use of starch for such purposes are well known to the art. For example, in the cosmetic field chalk serves merely as a filler while the starch content supplies texture and covering power, and in the paper industry starch serves as an adhesive and a carrying agent.

The following examples are illustrative of the general characteristic of the invention.

Example I

To a water suspension of starch comprising substantially ten parts, by weight, of starch to 100 parts of water, add, in small increments and while agitating the suspension, a dry mixture containing ten parts soda ash ($NaCO_3$) and eleven parts of calcium chloride ($CaCl_2$) in a finely divided state.

The purpose of the incremental additions is to avoid the presence of sufficient free soda ash in the suspension to gelatinize the starch.

As the calcium chloride reacts with the soda ash to yield a finely divided, insoluble precipitate of calcium carbonate ($CaCO_3$) such precipitates, carrying a positive charge, will be attracted to and be adsorbed by the electro-negative starch granules.

After the last increment of soda ash and calcium chloride is added, filter the mixture and wash and dry the solids thus obtained. The resulting starch-calcium carbonate product will be found to be a substantially perfect blend and to possess superior qualities as a filler.

Example II

To a water suspension of starch comprising substantially thirteen parts, by weight, of starch to 100 parts of water slowly add 10 parts of lime (CaO). After thoroughly stirring the mixture add, by any known means, carbon dioxide gas in an amount of substantially six parts by weight.

The resulting, finely divided precipitate of calcium carbonate will be attracted to and be adsorbed by the starch granules as described in Example I and the insoluble product, when filtered off, washed and dried, will be identical to the product of Example I.

In the above examples, as is preferred, the relative amounts of the ingredients are such that the insoluble alkaline earth precipitate will be substantially in the same amount, by weight, as the starch so that the resulting blend will be as near as possible to a one to one ratio although, obviously, different ratios may be employed for special needs without departing from the spirit or scope of the present invention.

The above examples, it will be understood, are merely illustrative and the invention is not limited thereto as the invention is applicable, in like manner, to the production of a blend of starch and insoluble salts of other alkaline earth metals by precipitating said salts, by any one of various chemical expedients, in a water suspension of starch. Obviously, the starch must be ungelatinized starch or, in any event, starch which has not been modified to such a degree as to render it soluble in water. It is intended to cover all modifications and variations within the scope of the following claims.

I claim:

1. A filler comprising in a water insoluble state starch having chemically deposited on each granule thereof a water-insoluble salt of an alkaline earth metal.

2. Method of making a filler which comprises precipitating a water-insoluble salt of an alkaline earth metal in a water suspension of starch containing no solubles.

3. Method of making a filler which comprises chemically precipitating calcium carbonate in a water suspension of starch.

4. Method of producing an intimate blend of starch and a water-insoluble salt of an alkaline earth metal which comprises preparing a water suspension of water-insoluble starch; adding to the suspension, while agitating the same, reagents which will react to precipitate a water insoluble salt of an alkaline earth metal whereby said precipitate will be deposited on the starch granules by ionic adsorption; then filtering the mixture and washing and drying the filtrate.

5. Method of producing a physico-chemical blend of starch and a water-insoluble salt of an alkaline earth metal which comprises suspending water-insoluble starch in water; chemically precipitating into said water suspension the insoluble salt of an alkaline earth metal whereby the negatively charged colloidal particles of the starch and the positively charged colloidal particles of the alkaline earth metal are brought together by ionic adsorption, and then filtering out and drying the resulting physico-chemical blend of the insolubles.

HAROLD E. BODE.

CERTIFICATE OF CORRECTION.

Patent No. 2,188,494. January 30, 1940.

HAROLD E. BODE.

It is hereby certified that error appears in the printed specification of the above numbered patent requiring correction as follows: Page 1, second column, line 55, and page 2, first column, line 1, claim 1, for the words "in a water insoluble state starch" read starch in a water insoluble state; and that the said Letters Patent should be read with this correction therein that the same may conform to the record of the case in the Patent Office.

Signed and sealed this 12th day of March, A. D. 1940.

(Seal)

Henry Van Arsdale,
Acting Commissioner of Patents.